(12) United States Patent
Storteig et al.

(10) Patent No.: US 7,881,152 B2
(45) Date of Patent: Feb. 1, 2011

(54) ACTIVE STEERING FOR MARINE SOURCES

(75) Inventors: Eskild Storteig, Lierskogen (NO);
Martin Howlid, Slependen (NO); Rohit Singh, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 48 days.

(21) Appl. No.: 12/175,939

(22) Filed: Jul. 18, 2008

(65) Prior Publication Data

US 2008/0279042 A1 Nov. 13, 2008

Related U.S. Application Data

(63) Continuation of application No. 10/877,823, filed on Jun. 25, 2004, now Pat. No. 7,415,936, application No. 12/175,939, filed on Jul. 18, 2008, which is a continuation-in-part of application No. 10/552,795, filed as application No. PCT/EP2004/050527 on Apr. 15, 2004.

(60) Provisional application No. 60/576,525, filed on Jun. 3, 2004.

(30) Foreign Application Priority Data

Apr. 15, 2003 (GB) .................................. 0308632.9

(51) Int. Cl.
*G01V 1/38* (2006.01)
(52) U.S. Cl. ......................................... 367/16; 114/244
(58) Field of Classification Search ............. 367/15–19; 114/242–254
See application file for complete search history.

(56) References Cited

U.S. PATENT DOCUMENTS 3,412,704 A 11/1968 Buller et al.
3,479,638 A 11/1969 Rusnak
3,730,483 A * 5/1973 Newell ........................ 254/371
3,921,124 A 11/1975 Payton
3,953,826 A 4/1976 Brundrit et al.

(Continued)

FOREIGN PATENT DOCUMENTS

| EP | 0 018 053 A1 | 10/1980 |
| EP | 0 319 716 A2 | 6/1989 |
| EP | 0 321 705 A2 | 6/1989 |
| EP | 0 525 391 A1 | 2/1993 |
| EP | 0 613 025 A1 | 8/1994 |

(Continued)

OTHER PUBLICATIONS

RCE Amendment (Sep. 15, 2010) and *Ex Parte* Quayle Office Action (Jul. 15, 2010); U.S. Appl. No. 105/552,795 (US 2007-0019504 A1—Howlid, et al).

(Continued)

*Primary Examiner*—Jack Keith
*Assistant Examiner*—Krystine Breier (57) ABSTRACT

A seismic survey system includes a winch having a winch cable coupleable to a source array towable between two deflected lead-ins, a positioning system for determining a current position of the source array and a controller for adjusting the winch to modify the current position of the source array to a desired crossline position. The winches may be attached to the deflected lead-ins or mounted on a tow vessel. The winches exert lateral forces on the source array, derived from the deflected lead-ins, to control the inline position of the source array. A method includes positioning a seismic source array in tow behind a vessel comprises determining a current position of the source array and adjusting a lateral force applied to the source array to move the source array to a desired crossline position. Optionally, by adjusting the gun cable winch, the inline position may be controlled.

13 Claims, 9 Drawing Sheets

U.S. PATENT DOCUMENTS

| | | | |
|---|---|---|---|
| 4,027,616 A | 6/1977 | Guenther et al. |
| 4,033,278 A | 7/1977 | Waters |
| 4,063,213 A | 12/1977 | Itria et al. |
| 4,110,726 A | 8/1978 | Dorrance et al. |
| 4,506,352 A | 3/1985 | Brandsaeter et al. |
| 4,693,336 A | 9/1987 | Newman |
| 4,716,553 A | 12/1987 | Dragsund et al. |
| 4,719,987 A | 1/1988 | George, Jr. et al. |
| 4,727,956 A | 3/1988 | Huizer |
| 4,729,333 A | 3/1988 | Kirby et al. |
| 4,845,686 A | 7/1989 | Brac |
| 4,862,422 A | 8/1989 | Brac |
| 4,868,793 A | 9/1989 | Dunbar |
| 4,890,568 A | 1/1990 | Dolengowski |
| 4,960,183 A | 10/1990 | Young, II |
| 4,974,212 A | 11/1990 | Sheiman |
| 5,052,814 A | 10/1991 | Stubblefield |
| 5,113,377 A | 5/1992 | Johnson |
| 5,142,498 A | 8/1992 | Duren |
| 5,144,588 A | 9/1992 | Johnston et al. |
| 5,184,329 A | 2/1993 | Regnault et al. |
| 5,281,773 A | 1/1994 | Duren |
| 5,353,223 A | 10/1994 | Norton et al. |
| 5,448,233 A | 9/1995 | Saban et al. |
| 5,523,951 A | 6/1996 | Kriesgman et al. |
| 5,532,975 A | 7/1996 | Elholm |
| 5,619,474 A | 4/1997 | Kuche |
| 5,771,202 A | 6/1998 | Bale et al. |
| 5,784,335 A | 7/1998 | Deplante et al. |
| 5,790,472 A | 8/1998 | Workman et al. |
| 5,920,828 A | 7/1999 | Norris et al. |
| 5,924,049 A | 7/1999 | Beasley et al. |
| 5,995,452 A | 11/1999 | Bouyoucus |
| 6,005,828 A | 12/1999 | Carroll et al. |
| 6,011,752 A | 1/2000 | Ambs et al. |
| 6,028,817 A | 2/2000 | Ambs |
| 6,031,789 A | 2/2000 | Broussard et al. |
| 6,088,298 A | 7/2000 | Onat |
| 6,091,670 A | 7/2000 | Oliver et al. |
| 6,256,589 B1 | 7/2001 | Gallotti Guimaraes |
| 6,292,436 B1 | 9/2001 | Rau et al. |
| 6,459,653 B1 | 10/2002 | Kuche |
| 6,504,792 B2 | 1/2003 | Barker |
| 6,510,390 B1 | 1/2003 | Bunting et al. |
| 6,525,992 B1 | 2/2003 | Olivier et al. |
| 6,590,831 B1 | 7/2003 | Bennett et al. |
| 6,606,958 B1 * | 8/2003 | Bouyoucos | 114/242 |
| 6,618,321 B2 | 9/2003 | Brunet |
| 6,671,223 B2 | 12/2003 | Bittleston |
| 6,681,710 B2 * | 1/2004 | Semb | 114/244 |
| 6,691,038 B2 | 2/2004 | Zajac |
| 6,873,571 B2 | 3/2005 | Clayton et al. |
| 6,932,017 B1 | 8/2005 | Hillesund et al. |
| 7,047,898 B2 | 5/2006 | Petersen et al. |
| 7,446,706 B2 | 11/2008 | Riley et al. |
| 2003/0039170 A1 | 2/2003 | Soreau et al. |
| 2003/0151974 A1 | 8/2003 | Kutty et al. |
| 2003/0168277 A1 | 9/2003 | Hopperstad et al. |
| 2003/0208320 A1 | 11/2003 | Zajac |
| 2003/0220745 A1 | 11/2003 | Campbell |
| 2004/0060498 A1 | 4/2004 | Petersen |
| 2004/0136266 A1 | 7/2004 | Howlid et al. |
| 2004/0196737 A1 | 10/2004 | Nicholson |
| 2005/0219948 A1 | 10/2005 | Naess |
| 2007/0019504 A1 | 1/2007 | Howlid et al. |
| 2009/0141587 A1 | 6/2009 | Welker et al. |

FOREIGN PATENT DOCUMENTS

| | | |
|---|---|---|
| GB | 2 364 388 A | 1/2002 |
| GB | 2 412 965 A | 10/2005 |
| GB | 2 414 804 A1 | 12/2005 |
| WO | 01 55747 A1 | 8/2001 |
| WO | 2004 092771 A2 | 10/2004 |
| WO | 2005 096015 A1 | 10/2005 |
| WO | 2005 096018 A1 | 10/2005 |

OTHER PUBLICATIONS

RCE Amendment (Aug. 7, 2010), Final Office Action (Feb. 19, 2010), Response to Office Action (Dec. 1, 2009), and Office Action (Sep. 2, 2009); U.S. Appl. No. 10/598,732 (US 2009-0141587 A1—Welker, et al).

Schmidt; "Solution for Seismic Source Registration"; WorldOil. com; 226(9), 1-3; Sep. 2005.

Gikas, et al.; "Reliabiliky Analysis in Dynamic Systems: Implications for Positioninng Marine Seismic Networks"; Geophysics; vol. 64, No. 4, pp. 1014-1022; Jul./Aug. 1999.

Armstong et al.; "The Best Prameter Subset Using the Chebychev Curve Fitting Criterion"; Mathematical Programming; vol. 27, No. 1, pp. 64-67; 1983.

* cited by examiner

ACTIVE STEERING FOR MARINE SOURCES

This application is a continuation of U.S. patent application Ser. No. 10/877,823, filed Jun. 25, 2004, titled ACTIVE STEERING FOR MARINE SOURCES, which claims the benefit of and priority to U.S. Provisional Application Ser. No. 60/576,525, filed Jun. 3, 2004. This application is also a continuation-in-part of U.S. patent application Ser. No. 10/552,795, having a 35 USC 371 date of Jul. 13, 2006, and titled ACTIVE STEERING FOR MARINE SEISMIC SOURCES, which is a US national phase application of PCT/EP04/50527, filed Apr. 15, 2004, and titled ACTIVE STEERING FOR MARINE SEISMIC SOURCES, which is an international application of GB Patent Application Serial Number 0308632.9, filed Apr. 15, 2003, and titled ACTIVE STEERING FOR MARINE SEISMIC SOURCES. Each of the aforementioned related patent applications is herein incorporated by reference.

BACKGROUND OF THE INVENTION

1. Field of the Invention

This invention relates to seismic exploration and more specifically, to marine seismic survey systems.

2. Description of the Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid provide more information regarding the subsurface formations than two-dimensional seismic surveys. 3-D surveys may be conducted with up to twelve or more streamers that form an array covering a large area behind the vessel. The streamers typically vary in length between three and twelve kilometers. Tail buoys attached at the streamer distal ends carry radar reflectors and navigation equipment and hydrophones are positioned along each streamer. Since the grid is often much wider than the array, the tow vessel must turn around and tow the array in laps across the grid, being careful not to leave large gaps between the laps across the grid.

A multiple streamer array requires diverters near the vessel to pull the streamers outwardly from the direct path behind the seismic tow vessel and to maintain the traverse or crossline spacing between individual streamers. Diverters rely on hydrodynamic forces, e.g., lift, created by forward motion through the water to pull the streamers outwardly and to maintain the transverse position relative to the vessel path. If forward motion changes due to ocean currents and other environmental factors, the diverters will not maintain the desired streamer position.

In 4-D geophysical imaging, a 3-D seismic survey is repeated over a grid that has been previously surveyed. This series of surveys taken at different times may show changes to the geophysical image over time caused, for example, by extraction of oil and gas from a deposit. It is important that the sources being used to generate the acoustical pulses be located as closely as possible to the same location as in previous surveys over the same grid. This, of course, has been difficult to accomplish in a marine survey because the acoustical source and receiver arrays are typically towed behind the tow vessel and are subject to wave and current movement.

In addition to the deployment and operation difficulties associated with towing multiple streamers, conventional techniques limit the ability to position source equipment and receivers in different relative positions and orientations. Because the sources and receivers are towed behind the same seismic vessel, array design is limited by the tow configuration. Each towed array is also subject to crosscurrents, wind, waves, shallow water, and navigation obstacles that limit the coverage provided by the survey system. While solutions for streamer steering/positioning have been successfully developed (e.g., WeternGeco's Q-FIN), source array steering has not been implemented for commercial use.

Accordingly, a need exists for an improved techniques and equipment for conducting marine seismic operations. It would be an advantage if such techniques and equipment allowed the acoustic sources to be positioned in desired locations while being towed behind a vessel.

SUMMARY OF THE INVENTION

The present invention provides apparatus and methods for active steering of marine sources. In a preferred embodiment of a seismic survey system for in-sea use, the system includes a winch having a winch cable that is coupleable to a source array towable between two deflected lead-ins. The system further includes a positioning system for determining a current position of the source array and a controller for adjusting the winch to modify the current position of the source array to a desired crossline position.

The winch may be mounted on the tow vessel or alternatively, may be mounted or attached to one of the deflected lead-ins at an in-sea location. In one embodiment, a capstan winch is mounted on the tow vessel. A winch cable wrapped around the capstan has a first end and a second end that are each coupleable to opposite sides of the source array. It should be recognized that attaching a winch cable to a source array in any of the disclosed embodiments includes attaching the winch cable to any portion of the source array or any of the distance ropes, tow cables, or other devices that are linked or attached to the source array. The system further includes a first pulley attached to the first deflected lead-in and a second pulley attached to the second deflected lead-in, wherein a first segment of the winch cable wrapped around the capstan and having the first end of the cable engages the first pulley and a second segment of the winch cable wrapped around the capstan and having the second end engages the second pulley. By rotating the capstan in one direction or the other, the source array may be moved to a desired crossline position.

In another embodiment, two winches are mounted on the tow vessel. The two winches may include one winch having two separate reels that are independently operable. With two winches, each having a separate winch cable, the end of each of the separate winch cables may be coupled to respective opposing sides of the source array. The system further includes a first pulley attached to the first deflected lead-in and a second pulley attached to the second deflected lead-in, wherein one of the winch cables engages the first pulley and the second winch cable engages the second pulley.

In an embodiment that includes an in-sea winch, a first winch and second winch each have a winch cable that is coupleable to respective opposite sides of the source array. Furthermore, the first winch is attached to the first deflected lead-in and the second winch is attached to the second deflected lead-in. Attachment to a lead-in in all of the enclosed embodiments includes attachment directly or indirectly to the lead-in by use of distance ropes, buoys, chain or any other device that provides a connection or link to the deflected lead-in.

In a preferred embodiment, the seismic survey system includes a positioning system that comprises one or more positioning units mounted on one or more source arrays. The positioning system may be selected from one of a global positioning system, an acoustic network, a laser system, and a combination thereof. The positioning system may be a satellite-based positioning system.

The positioning system preferably provides a signal to the controller for indicating the current position of the source array. The controller may be adapted for triggering a seismic source on the source array when the source array is at the desired crossline position. The controller may be positioned at a location selected from a towing vessel, the first winch, and combinations thereof.

In a preferred embodiment, the system steers the source array to a desired crossline position that is substantially identical to a source array position employed in a previous seismic survey. The desired crossline position may be defined by a streamer spread employed in a previous seismic survey and may be selected to avoid gaps in a seismic survey coverage.

Another embodiment of a seismic survey system for in-sea use includes a winch comprising a winch cable coupleable to a source array that is towable between a deflected lead-in and a centerline of a survey path, a positioning system for determining a current position of the source array and a controller for adjusting the winch to modify the current position of the source array to a desired crossline position. The system further includes a gun cable winch comprising one or more gun cable reels for adjusting a length of each of one or more gun cables that tow the source array, wherein the controller is further useful for adjusting the gun cable winch to modify the current position of the source array to a desired inline position. One or more actuators for rotating the one or more gun cable reels are also included in the system, wherein the one or more actuators are powered by a system selected from electric, pneumatic, hydraulic or a combination thereof. The controller activates each of the one or more gun cable reels to adjust the length of the one or more gun cables.

A further embodiment of the present invention includes a seismic survey system that includes a winch comprising a winch cable, wherein the winch cable is coupleable to a deflected lead-in, a roller slideably coupled to the winch cable and attached by a distance rope to a source array, a positioning system for determining a current position of the source array, and a controller for adjusting the winch to modify the current position of the source array to a desired crossline position.

The present invention also includes methods for the active steering of marine sources. In one embodiment, the present invention provides a method of positioning a seismic source array in tow behind a vessel comprising determining a current position of the source array and adjusting a lateral force applied to the source array to move the source array to a desired crossline position. The lateral force may be generated by one or more towed deflectors.

The method may further include comparing the desired crossline position with the current position and performing an appropriate action to accomplish the step of adjusting a lateral force applied to the source array to move the source array to a desired crossline position. The step of performing an appropriate action may comprise adjusting one or more winches operatively connected to the one or more towed deflectors.

Additional steps of a preferred method may include sending a control signal to the one or more winches, rotating one or more reels of the one or more winches in response to the control signal, and triggering a seismic source on the source array when the source array is at the desired crossline position.

To control the location of the source array to a desired inline position, a preferred method may include the step of adjusting a gun cable winch to change the length of one or more gun cables towing the source array to move the source array to a desired inline position. Other preferred steps may include comparing the desired inline position with the current position, and determining an adjustment to apply to the gun cable winch. Additionally, a preferred method may include the steps of sending a control signal to one or more actuators of the gun cable winch and rotating one or more reels of the gun cable winch in response to the control signal.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

The present invention provides a seismic survey system that includes one or more source arrays towed behind a tow vessel. The system may be used in association with one or more receiver arrays for conducting seismic surveys of the subsurface geological formations that underlie a body of water by guiding the one or more source arrays over a desired path through the water. It should be noted that the apparatus and methods of the present invention may be used without towed streamers as, for example, a seabed application having sensors lying on the seabed with a source vessel towing source arrays as disclosed herein, firing the guns on the source array at predetermined locations. One preferred embodiment of the present invention comprises a winch having a winch cable coupled to a source array. The winch modifies the crossline position of the source array in the water by adjusting the length of the winch cable between the winch and the source array. Optionally, another winch may be used to modify the inline position of the source array by adjusting the length of the cable towing the source array. "Cross-line" and "inline" mean perpendicular and parallel (respectively) to a direction of tow.

In a preferred embodiment, the source array is towed between two deflectors being towed by the tow vessel. The deflectors are towed by lead-ins that are deflected to opposite sides of the source array. Other lead-ins for towing other seismic equipment may also be linked to a deflector lead-in by distance ropes so that these linked lead-ins are also deflected lead-ins that are pulled to opposite sides of the source array. Lateral forces are applied to the source array from the deflected lead-ins by winch cables that are attached to the source array so that the source array can be moved laterally to its desired crossline position. The lateral forces are applied to the source array through the winch cable by either mounting the winch to a deflected lead-in or by mounting the winch on the tow vessel and running the winch cable through a pulley that is attached to the deflected lead-in. The system further comprises a positioning system for determining the current position of the source array and a controller for adjusting the winch to modify the current position of the source array to a desired crossline position and optionally, a desired inline position.

The deflectors that are towed through the water by the deflector lead-ins provide the lateral forces that are applied by the winch cables to move the source array to the desired crossline position. Such deflectors are well known to those having ordinary skill in the art. One example of a suitable deflector is disclosed in U.S. Pat. No. 5,357,892, which is hereby fully incorporated by reference.

Objects that are towed behind a tow vessel traveling in a straight line tend to follow the centerline of the tow vessel, at least when there is no wind, current, waves or other outside forces acting upon the towed objects. Generally, the towed objects fall in towards their non-steered tow position. When an object or group of objects has to be towed through the water behind a vessel for the purpose of performing special measurements, such as towing source arrays and seismic streamer cables for performing seismic surveys, it is often important that the tow does not follow directly behind the towing vessel or some other non-steered tow position, but rather is pulled out to one side of the tow vessel centerline in order to follow a specific path, e.g., a survey design path. Deflectors are among those devices that are towed behind a vessel to deflect the tow line to one side of the towing vessel so that the towed equipment does not simply follow the path of the centerline of the tow vessel.

The winch provided in the present invention controls the crossline position of the source array by exerting the lateral forces on the source array that are generated by the deflectors being towed by the deflector lead-ins. Since the towed source array generally moves along the centerline of the tow vessel due to the forces exerted on the source array by the water, the winch is used generally to steer the source array away from the centerline of the tow vessel to a desired crossline position. Therefore, winch cables may be connected to both sides of the source array to selectively pull towards either of the two deflectors deployed on the opposite sides of the source array. In all disclosed embodiments, it should be recognized that attaching a winch cable to a source array includes attaching the winch cable to any portion of the source array or any of the distance ropes, tow cables, or other devices that are linked or attached to the source array. The winch cable may be constructed of rope, wire, chain or other materials known by those having ordinary skill in the art.

In one embodiment, a capstan winch is mounted on the tow vessel with pulleys mounted on each of two deflected lead-ins. A capstan winch includes a drum that rotates about its axis to wind a winch cable that has been wrapped around it. As the capstan drum rotates in a first direction, a pulling force is exerted on a first end of the winch cable. As the capstan drum rotates in a second direction, a pulling force is exerted on the second end of the winch cable. The grip between the winch cable and the drum is a function of friction and on the number of times that the winch cable has been wrapped around the drum.

Each end of the winch cable is preferably threaded through one of the pulleys mounted on or attached to the deflected lead-ins and then coupled to one of the opposite sides of the source array. In operation, as the capstan drum rotates in the first direction, the length of the first segment of the winch cable between the capstan and a first side of the source array becomes shorter while the length of a second segment of winch cable between the capstan and a second side of the source array becomes longer. For example, as the capstan pulls the first segment of winch cable towards the capstan drum, the pulley mounted on the first deflected lead-in exerts its lateral force on the source array, pulling the source array towards the first deflected lead-in. When the rotation of the capstan drum is reversed, the capstan pulls the second segment of winch cable towards the capstan drum and the pulley mounted on the second deflected lead-in exerts its lateral force on the source array, pulling the source array towards the second deflected lead-in. Therefore, by rotating the capstan in one direction or the other, the source array is selectively guided to either side of the centerline of the tow vessel as desired. To facilitate deployment of the winch cable, the winch cable may be stored in two segments on separate reels mounted on the tow vessel. After deploying the separate segments into the water, the proximal ends of the segments may be joined together and then wrapped around the capstan.

In a particular embodiment, the winch mounted on the tow vessel comprises two reels with two separate winch cables. The first reel pulls the first winch cable that is preferably threaded through the pulley mounted on the first deflected lead-in and then attached to the first side of the source array. The second reel pulls the second winch cable that is preferably threaded through the pulley mounted on the second deflected lead-in and then attached to the second side of the source array. It should be noted that when the winch mounted on the tow vessel pulls the array towards the first deflected lead-in, the winch cable pulling the source array in that direction is shortened and simultaneously, the winch cable attached to the opposite side of the source array is preferably lengthened. When using a capstan winch having opposite ends of the same cable attached to opposite sides of the source array, as one segment is lengthened, the other segment is simultaneously shortened since the two segments make up one winch cable. However, when using a winch with two reels and two separate winch cables, as the first reel pulls its winch cable in, the other reel preferably allows its winch cable to feed out so that the source array can move towards the first deflected lead-in without imposing a lateral force against the second deflected lead-in. Therefore, to move the source array towards the first deflected lead-in, the first reel pulls its winch cable in and the second reel feeds its winch cable out in an equal amount. Therefore, by rotating the two reels in opposite directions, the source array is selectively guided to either side of the centerline of the tow vessel as desired.

In another embodiment, the winch is not mounted on the tow vessel, but is instead mounted on or attached to the deflected lead-ins. Alternatively, the in-sea winch may be mounted in other convenient locations, such as on the source array itself, on the distance ropes securing the source array or on a float between the source array and the deflected lead-in. Instead of using pulleys to translate the pull of the winch from the tow vessel into a lateral force, the in-sea winch is mounted on or near the deflected lead-ins so that the winch exerts the lateral force directly upon the source array. In this embodiment, a first winch reel is attached to the first deflected lead-in and a second winch reel is attached to the second deflected lead-in. To pull the source array towards the first deflected lead-in, the first winch reel shortens its winch cable to pull the source array towards it and simultaneously, the second winch reel preferably feeds its winch cable out to allow the source array to move towards the first deflected lead-in without exerting a force upon the second deflected lead-in. Therefore, as in the embodiment that includes two reels mounted on the tow vessel, by rotating the two reels mounted on the two deflected lead-ins in opposite directions, the source array is selectively guided to either side of the centerline of the tow vessel as desired.

A source array may include one or more sub-arrays that are coupled together with distance ropes to form one source array. Therefore, when attaching the winch cables to the source array, the winch cables are preferably coupled to the outermost sub-array or the outermost distance ropes that are located on each side of the source array, which are the sub-arrays closest to each of the deflected lead-ins.

Typically, one or two source arrays are towed behind a vessel conducting a seismic survey although more than two arrays may be towed. In one embodiment of the present invention having more than one source array, the source arrays may be coupled together with distance ropes so that the two or more source arrays may be considered to be a single source array with winch cables attached only to the outermost sub-arrays or their distance ropes placed closest to the two deflected lead-ins. In this embodiment, the two or more source arrays may be selectively moved as a group from one side of the vessel centerline to the opposite side of the vessel centerline as desired.

In another embodiment that includes multiple source arrays, one source array may be separately steered to one side of the vessel centerline and another source array may be separately steered to the opposite side of the vessel centerline. Since the forces exerted on the towed source arrays by the water tend to result in the source arrays following directly behind the tow vessel traveling in a straight line, lateral forces are typically applied to pull the source array to one side of the centerline. Therefore, one source array may be pulled laterally to the first deflected lead-in and the second source array may be pulled laterally to the second deflected lead-in to place the source arrays at desired locations on opposite sides of the tow vessel centerline. In this embodiment, two winches may be mounted on the tow vessel, each having a winch cable threaded through a pulley attached to one of the deflected lead-ins. Alternatively, an in-sea winch may be attached to each of the deflected lead-ins or to alternative sites as disclosed above to pull the source arrays off the tow vessel centerline.

Optionally, an in-sea winch may be mounted between the two source arrays so that when desired, the two source arrays could be pulled together and treated as one group of arrays as disclosed above. In this optional embodiment, the in-sea winch mounted between the source arrays allows each of the source arrays to be steered independently of the other but provides an option for pulling the source arrays together and steering them as a group when desired. Preferably, the winch cable on the in-between winch is operated with only a slight tension on the cable to prevent the cable from becoming tangled but not with enough tension to exert any significant force to the source arrays when they are not being steered as a group. A controller on the winch may monitor the cable tension and adjust the reel rotation to maintain a desired minimum cable tension. Alternatively, the on-board controller may monitor the distance between the two arrays using the positioning system and send a signal to the in-between winch to let out only an amount of cable that is just over the calculated distance between the two source arrays. For example, it may be desirable to pull separate source arrays together in this manner prior to changing the direction of the tow vessel so that that tow vessel can turn on a shorter radius without concern for tangling the cables.

Furthermore, in an embodiment of the present invention that includes multiple source arrays that are separately steered to a desired crossline position as described above, one or more winches may be utilized to adjust the length of the gun cables used to tow the source arrays and thereby modify the inline position of the source arrays. When conducting a seismic survey with multiple source arrays, preferably the source arrays are aligned evenly in their inline positions so that one source array is not towed ahead of another source array. This may be easily accomplished when the tow vessel is towing the seismic source arrays in waters with no appreciable current, wind or other outside forces and the tow vessel tracks along the centerline of the survey path. In these ideal conditions, equal lengths of gun cables are deployed to tow the source arrays and the source arrays are towed in evenly aligned inline positions.

However, in waters having strong currents or other outside forces acting on the tow vessel, towing the independently steered source arrays along the desired survey path requires the tow vessel to compensate for the outside forces by tracking a path that is not on the centerline of the survey path with the vessel centerline not parallel to the centerline of the survey path. In such an arrangement, the towed source arrays cannot maintain an inline alignment with each other because one of the source arrays is pulled ahead of the other source arrays due to the misalignment of the tow vessel centerline to the centerline of the survey path. For example, if the tow vessel is pointed to the left to compensate for current, the source array on the right may be pulled by its gun cables ahead of the source array on the left, thereby disrupting the inline alignment of the source arrays to each other.

To maintain the preferred inline alignment of the source array, the gun cable winches may be adjusted to vary the lengths of the gun cables that are used to tow the source arrays. As one source array is pulled ahead of another source array, the gun cables attached to the leading source array may be lengthened by feeding additional gun cables from the reels of the winch or winches. As the gun cables are lengthened, the source array drops back in alignment with the other source arrays.

In a preferred embodiment of the present invention, a positioning system determines the current position of the one or more source arrays and a control system monitors the current position of the one or more source arrays and sends a signal to one or more actuators on one or more winches to steer the source array to a desired location in the water. The capstan on a capstan winch or the reel on a mechanical winch is turned by an actuator. The actuator may rotate the capstan or the reel using hydraulic, pneumatic or electrical power. Optionally, brakes may be included on the winches as known to those having ordinary skill in the art and may be applied by sending a signal from the controller to apply the winch brakes. In accordance with the present invention, the controller may send signals to different reels to have them rotate in the same or opposite directions or may send a signal to just one winch, such as when the winch includes a capstan. Alternatively, the controller may send a signal to drive one reel and another signal to disengage the drive from a second reel so that the second reel can freely move, thereby allowing the winch cable to be pulled easily from the second reel.

While the winch assembly may be used for positioning a source array relative to the vessel, it is preferably used for positioning the source array relative to the Earth. Therefore, at least one positioning system unit is attached to the source array to provide the controller with the actual global location of the source array. The positioning system unit may be, for example, a global positioning system (GPS) unit, other satellite positioning system unit, laser, an acoustic network, or any other type of unit known to one having ordinary skill in the art that may be used to determine a specific location, including combinations thereof. By knowing the accurate location of the positioning system unit and knowing the in-line location of each acoustic source in the array relative to the positioning system unit, the controller can roughly determine the location of each acoustic source being towed behind the tow vessel in the one or more sonic arrays.

The controller compares the actual location of the positioning system unit with the desired location and then sends an appropriate signal to the winch assembly to steer the source array and thereby maintain or achieve the desired location. Since the controller is constantly monitoring the location of the source array, if the array is moved due to currents, waves, tides, winds or other outside forces, the controller may quickly sense the movement and instruct the winch assembly to steer the source array back to the desired location. In an embodiment having separately steered source arrays, the controller can instruct the gun cable winches to adjust the inline position of the source arrays as well. The controller may be located on the tow vessel communicating with the winch assembly that rotates the reels or capstan for adjusting the lengths of the winch cables. Alternatively, the controller located on the tow vessel may communicate with individual slave controllers located with the winch assembly as known to those having ordinary skill in the art. For example, in one embodiment having the winches attached to the deflected lead-ins, an on-board controller on the tow vessel communicates with a local controller built into or attached to each of the in-sea winches. These local controllers then transmit a signal to the winch to adjust the length of the winch cable and steer the source array to the optimum desired location. Alternatively, the on-board controller may send a signal directly to the winch actuator to rotate the reel without the intervening local controller.

In a preferred embodiment, the positioning system unit sends a signal to the navigation system of the tow vessel, which then communicates the location of the source array to the on-board controller. Using the navigation system of the tow vessel to receive the positioning system unit's signal is a preferred embodiment because the navigation system of the tow vessel conventionally has the capability of receiving and processing the signal from the positioning system unit. One suitable navigation system is the TRINAV system owned by WesternGeco. Alternatively, the capability of receiving and processing the signal from the positioning system unit may be made part of the on-board controller.

The on-board controller may be a computer, a distributed control system, an analogue control system or other control system known to those having ordinary skill in the art. The local controller may be one or more digital controllers, analogue controllers or combinations thereof. The on-board controller and the local controller may send control signals and receive transmitter signals or signals from each other by any means, including radio waves, electrical conductors, fiber optics or combinations thereof.

It is an important advantage of the present invention that the winch steers the source array to a predetermined position and maintains that position while the source array is being towed through the water. The predetermined position may be along a straight line or along any other track that has been defined either from experience or from previous surveys, or the position may be one that will simply enable optimum source positions in future surveys. Furthermore, during 4-D seismic surveys, it is important that the source array be located as closely as possible to the same locations used during previous surveys of the same grid. It is an advantage of the present invention that the winch may be used to locate the source array at the same location as used during previous surveys of the grid.

Without the one or more winches steering the source array, the position of the source array is subject to the influence of currents, waves, wind and changes in the direction of the tow vessel. By exerting lateral force on the water, the winch can steer the source array to the optimum predetermined crossline position by compensating for changes in the location of streamers, the tow vessel path or other influences. Furthermore, the cross-line positioning control may be used to decrease the turning radius of the streamer vessel without tangling the streamers. By adjusting the gun cable winches, the inline position of each of the source arrays may also be controlled.

Figure 1:
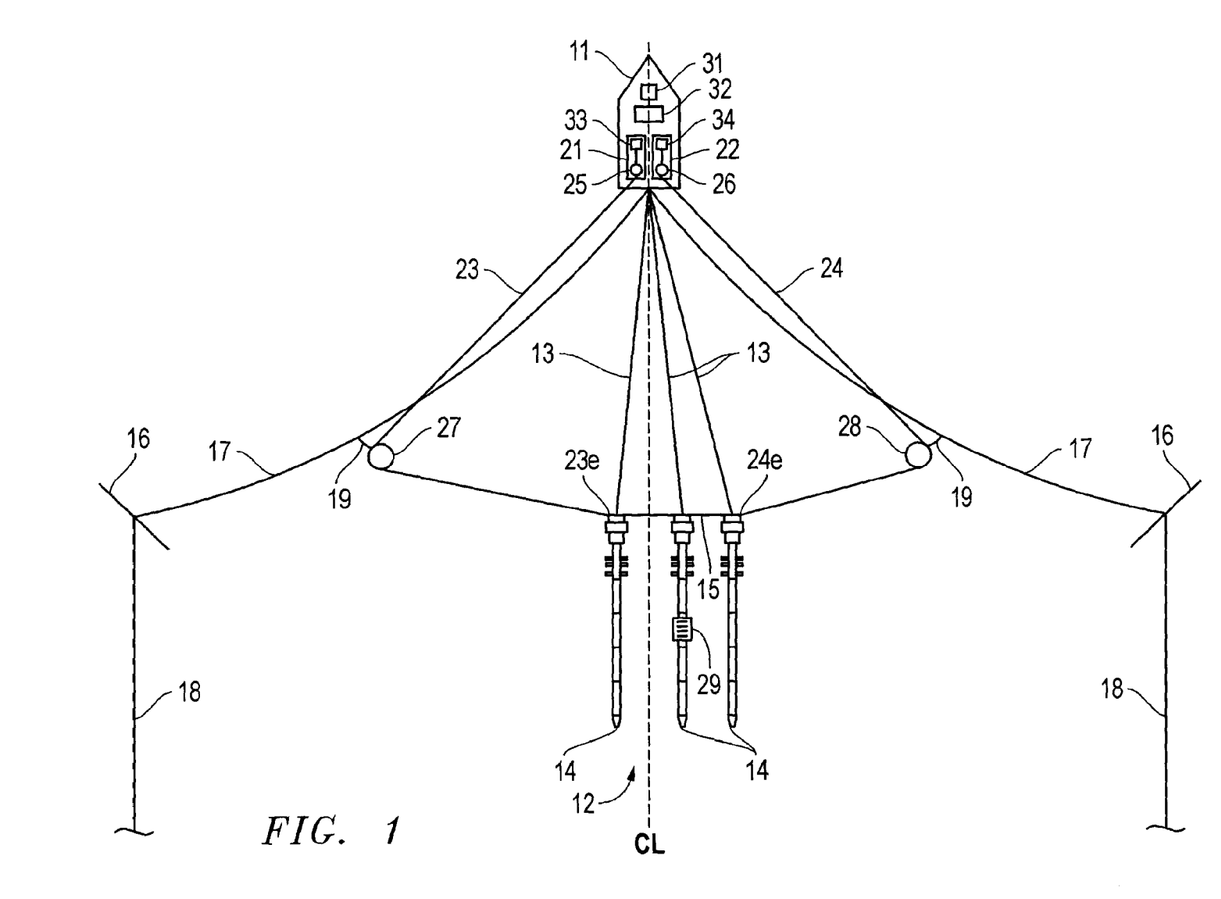
FIG. 1 is an aerial view of a marine seismic survey system having a deck mounted winch assembly for guiding the source array.

FIG. 1 is an aerial view of a marine seismic survey system having a deck mounted winch for guiding the source array. A tow vessel 11 tows a source array 12 using gun cables 13 attached to the source array 12. The source array 12 includes a plurality of sub-arrays 14 that are tied together with distance ropes 15. The tow vessel 11 also tows deflectors 16 by the deflected lead-ins 17. The deflectors 16 pull the seismic streamer cables 18 off the centerline of the tow vessel 11 so that the seismic streamer cables 18 do not simply follow the centerline of the tow vessel 11 as they are towed through the water, thereby promoting a desired spread and separation of the streamer cables.

Two winches 21, 22 are mounted on the tow vessel 11. Alternatively, one winch having double reels (not shown) may be mounted on the tow vessel. Winch cables 23, 24 are wrapped onto each of the reels 25, 26 and the ends 23e, 24e of each of the cables 23, 24 are attached to respective opposite sides of the source array 12. Each winch cable 23, 24 is threaded through a pulley 27, 28 attached to the deflected lead-ins 17 by a cable 19. While steering the source array 12, the reels 25, 26 both rotate at the same time but in opposite directions so that as one winch cable 23 is pulled in or shortened, the other winch cable 24 is let out or lengthened. As the first reel 25 rotates to pull in the winch cable 23, the lateral forces generated by the deflectors 16 are exerted on the source array 12 by the winch cable 23 and the pulley 27 through which the winch cable 23 passes.

Also mounted on the source array 12 is a global positioning system (GPS) unit 29 that notifies the navigation system 31 of the tow vessel 11 of the accurate location of the source array 12. A controller 32 compares the present location of the source array 12 as reported by the navigation system 31 to a desired position and then sends a control signal to the winch actuators 33, 34 to rotate the reels 25, 26, thereby guiding the source array 12 to the desired position.

Figure 2:
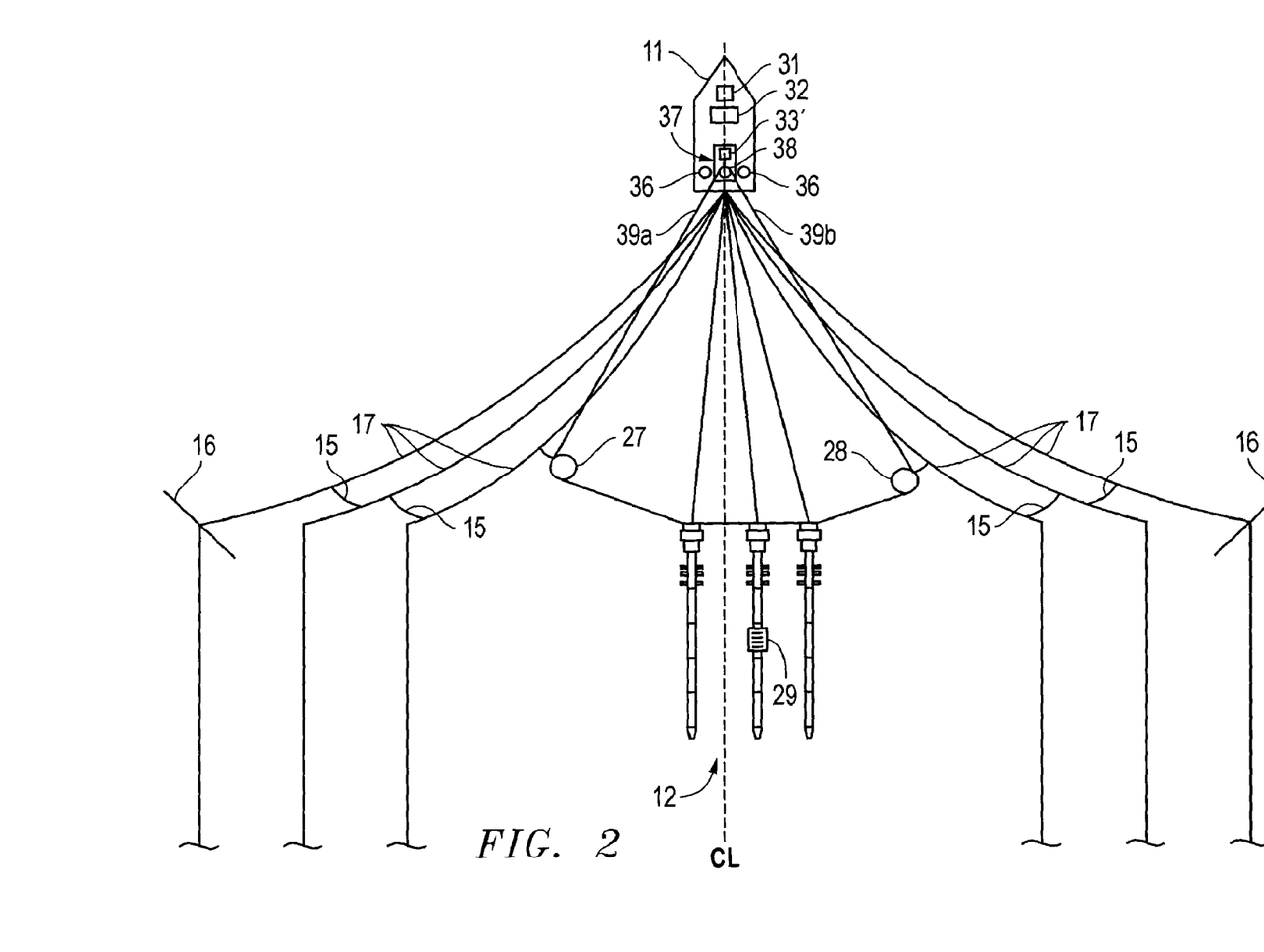
FIG. 2 is an aerial view of a marine seismic survey system having a deck mounted capstan winch for guiding the source array.

FIG. 2 is an aerial view of a marine seismic survey system having a deck mounted capstan winch for guiding the source array. A capstan winch 37 includes a winch cable 39 made up of two segments 39a, 39b that are wrapped around the capstan 38. The capstan winch 37 is mounted on the tow vessel 11. An actuator 33' rotates the capstan 38 to adjust the position of the source array 12. Each end of the winch cable segments 39a, 39b is attached to an opposite side of the source array 12. The segments 39a, 39b of the winch cable 39 are threaded through pulleys 27, 28 that are attached to the innermost deflected lead-ins 17. It should be noted that deflected lead-ins 17 include those lead-ins that are linked by distance ropes 15 to the lead-ins that are directly attached to the deflectors 16 for towing the deflectors 16. As the capstan 38 rotates, the lateral forces generated by the deflectors 16 are exerted on the source array 12 by the winch cable 39 and the pulleys 27, 28, pulling the source array 12 laterally to either side of the centerline of the tow vessel 11. For example, as the capstan 38 rotates clockwise, one winch cable segment 39a shortens and the other winch cable segment 39b lengthens, thereby pulling the source array 12 off the centerline of the tow vessel 11. Each of the winch cable segments 39a, 39b are stored separately on storage drums 36 and are joined together to form one winch cable after deployment into the water to facilitate deployment.

Figure 3:
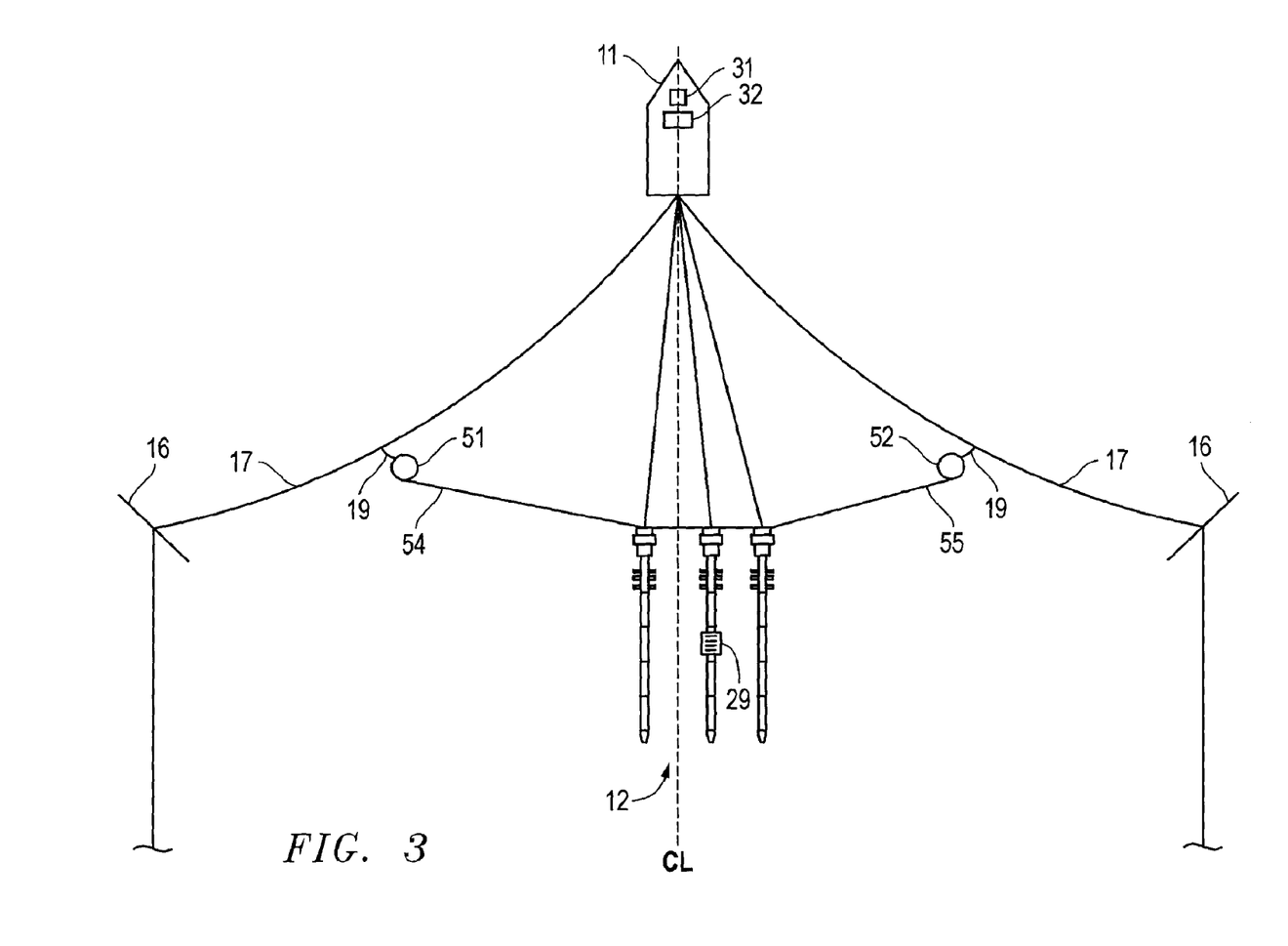
FIG. 3 is an aerial view of a marine seismic survey system having in sea winches for guiding the source array.

FIG. 3 is an aerial view of a marine seismic survey system having in sea winches for guiding the source array. Instead of mounting a winch on board the tow vessel 11 as shown in the previous figures, winches 51, 52 are attached to the deflected lead-ins 17 by ropes 19 to guide the source array 12 being towed by the tow vessel 11. Lateral forces generated by the deflectors 16 are exerted on the source array 12 when one of the winch cables 54, 55 is shortened by operating one of the winches 51, 52. As the first winch 51 pulls one of the winch cables 54 in, the other winch 52 releases its winch cable 55 so that the source array 12 is moved towards the first winch 51. Therefore, the reels on the winches 51, 52 rotate in opposite directions when in operation so that one winch 51 is taking in winch cable 54 when the other winch 52 is letting out winch cable 55.

Also mounted on the source array 12 is a global positioning system (GPS) unit 29 that notifies the navigation system 31 of the tow vessel 11 of the accurate location of the source array 12. A controller 32 compares the present location of the source array 12 as reported by the navigation system 31 to a desired position and then sends a control signal to the winches 51, 52, thereby guiding the source array 12 to the desired position.

Figure 4:
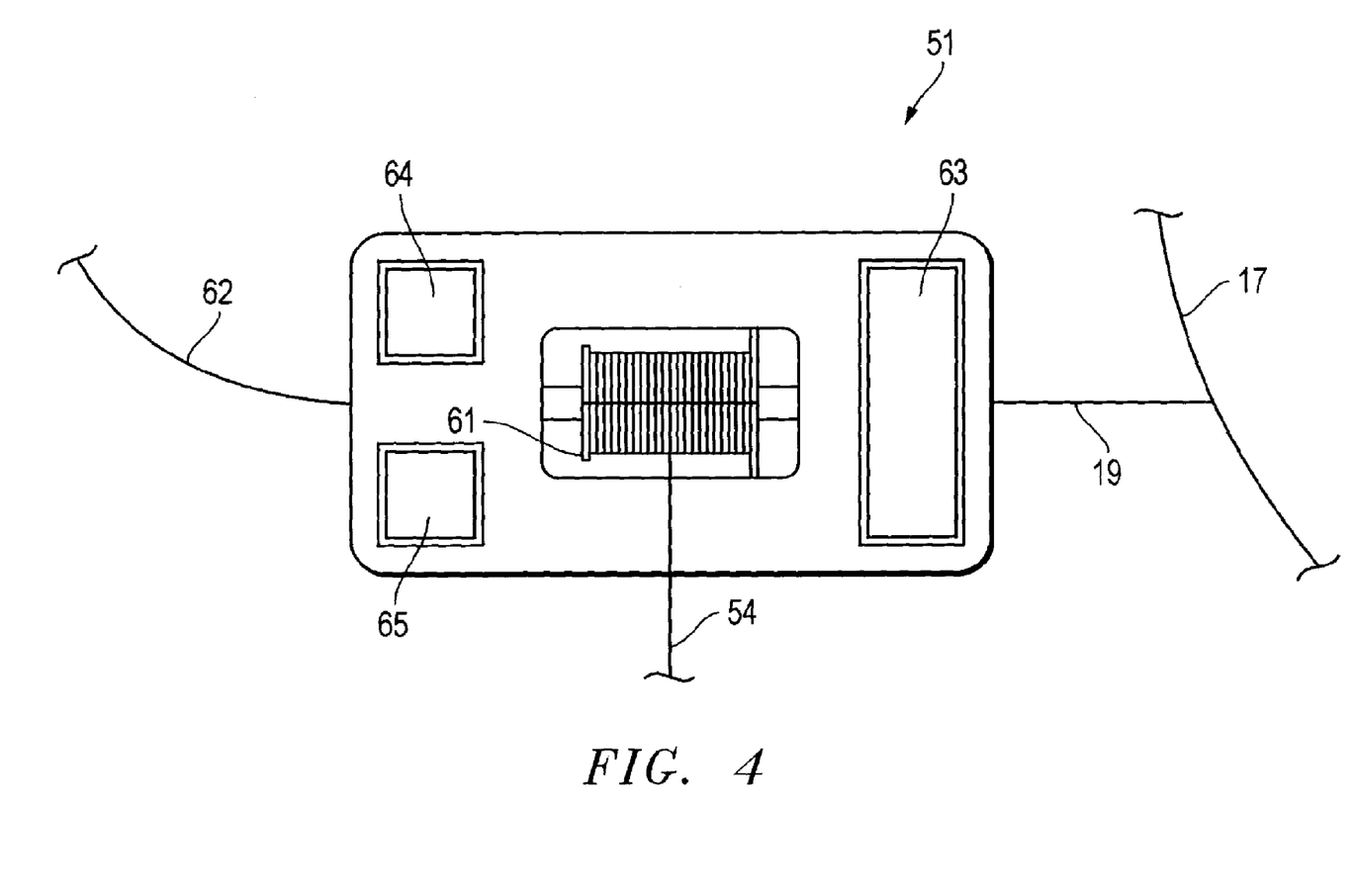
FIG. 4 is a top view of a winch suitable for steering a source array in accordance with the present invention.

FIG. 4 is a top view of a winch suitable for steering a source array in accordance with the present invention. The winch 51 is attached to the deflected lead-in 17 as shown in FIG. 3. The reel 61 rotates to take up or let out the winch cable 54, which is attached to one side of the source array 12 (see FIG. 3). The reel 61 may preferably be turned with an electric or hydraulic motor 63 powered from the umbilical cable 62 from the tow vessel 11. Batteries 64, or other energy storage unit, may also be included to provide power to turn the reel 61. A controller unit 65 may be provided for controlling the winch motor 63. Preferably, the controller unit 65 on the winch 51 acts as a slave controller to the controller 32 on the tow vessel 11 (see FIG. 3).

Figure 5:
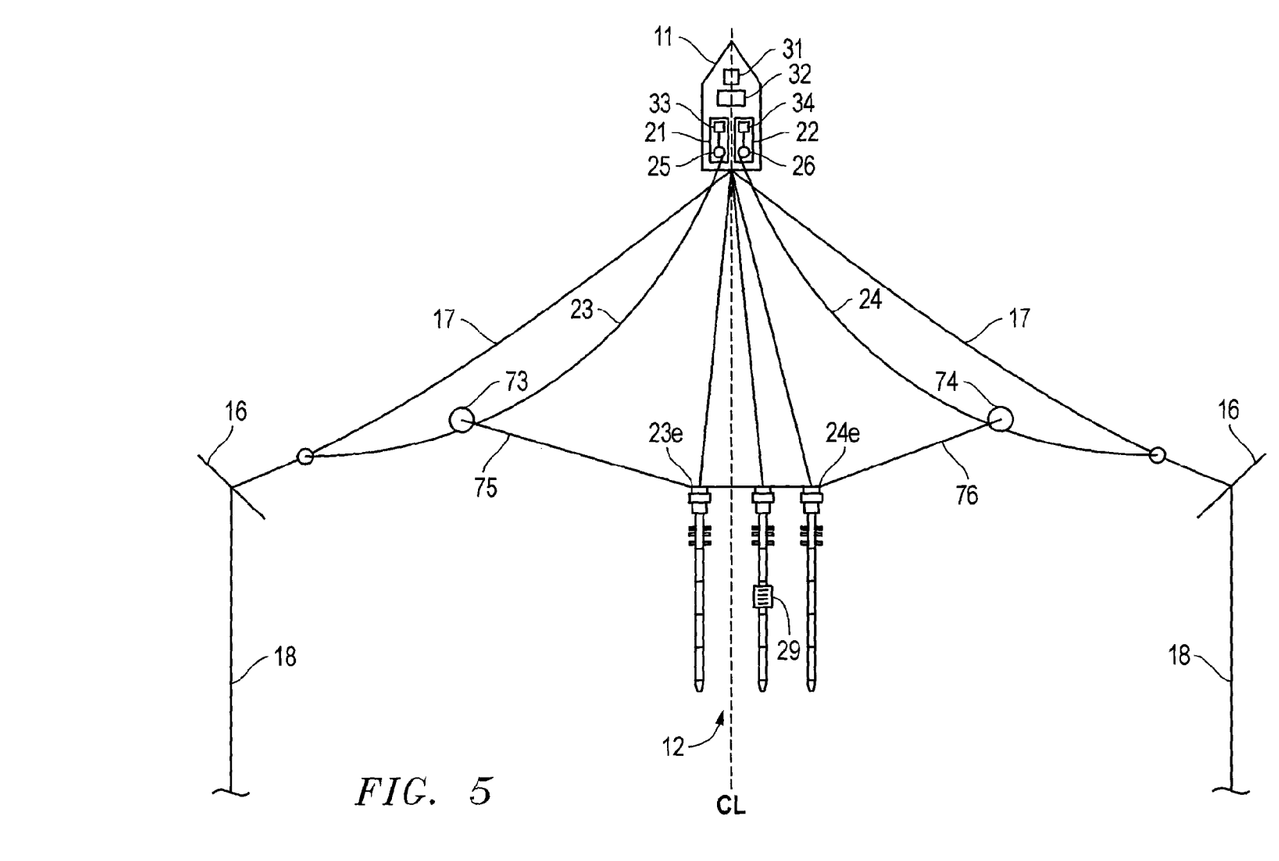
FIG. 5 is an aerial view of a marine seismic survey system having a deck mounted winch assembly for guiding the source array with rollers mounted on the winch cables.

FIG. 5 is an aerial view of a marine seismic survey system having deck mounted winches for guiding the source array with rollers mounted on the winch cables. In the embodiment shown, the source array 12 is towed by the tow vessel 11 between two deflectors 16 towed by the deflected lead-ins 17. Two winches 21, 22 are mounted on the tow vessel 11. The ends 23e, 24e of the winch cables 23, 24 are each attached to the deflected lead-ins 17. Rollers 73, 74 are slideably coupled to each of the winch cables 23, 24 so that the rollers freely slide along the winch cables 23, 24. Distance ropes 75, 76 couple opposite sides of the source array 12 to the rollers 73, 74 that are slideably coupled to the winch cables 23, 24.

As one of the winch cable 23, 24 is winched in, the slack in the winch cable 23, 24 is taken out so that the winch cable moves towards the deflected lead-ins 17. The roller 73, 74 slides along the winch cable 23, 24 being winched in and also moves towards the deflected lead-in 17 since the roller 73, 74 is attached to the winch cable 23, 24. The distance rope 75, 76 that couples the roller 73, 74 to opposite sides of the source array 12 pulls the source array 12 towards the deflected lead-in 17. For example, as one winch 21 rotates its reel 25 to pull in the winch cable 23, the slack from the winch cable 23 is removed and the winch cable 23 moves towards the deflected lead-in 17. As the winch cable 23 moves towards the deflected lead-in 17, the distance rope 75 coupling the roller 73 to the source array 12 exerts a lateral force on the source array 12, thereby moving the source array 12 to a desired location. As in the examples shown in previous figures, as the first winch reel 25 rotates to take in its winch cable 23, the second winch reel 26 rotates to feed out its winch cable 24 to allow the source array 12 to move laterally towards the first winch cable 23. It should be noted that the arrangement disclosed in this figure of rollers 73, 74 slideably coupled to the deflected lead-ins 17 may be used with multiple source array embodiments such as shown in FIGS. 7A-B and 8.

Figure 6:
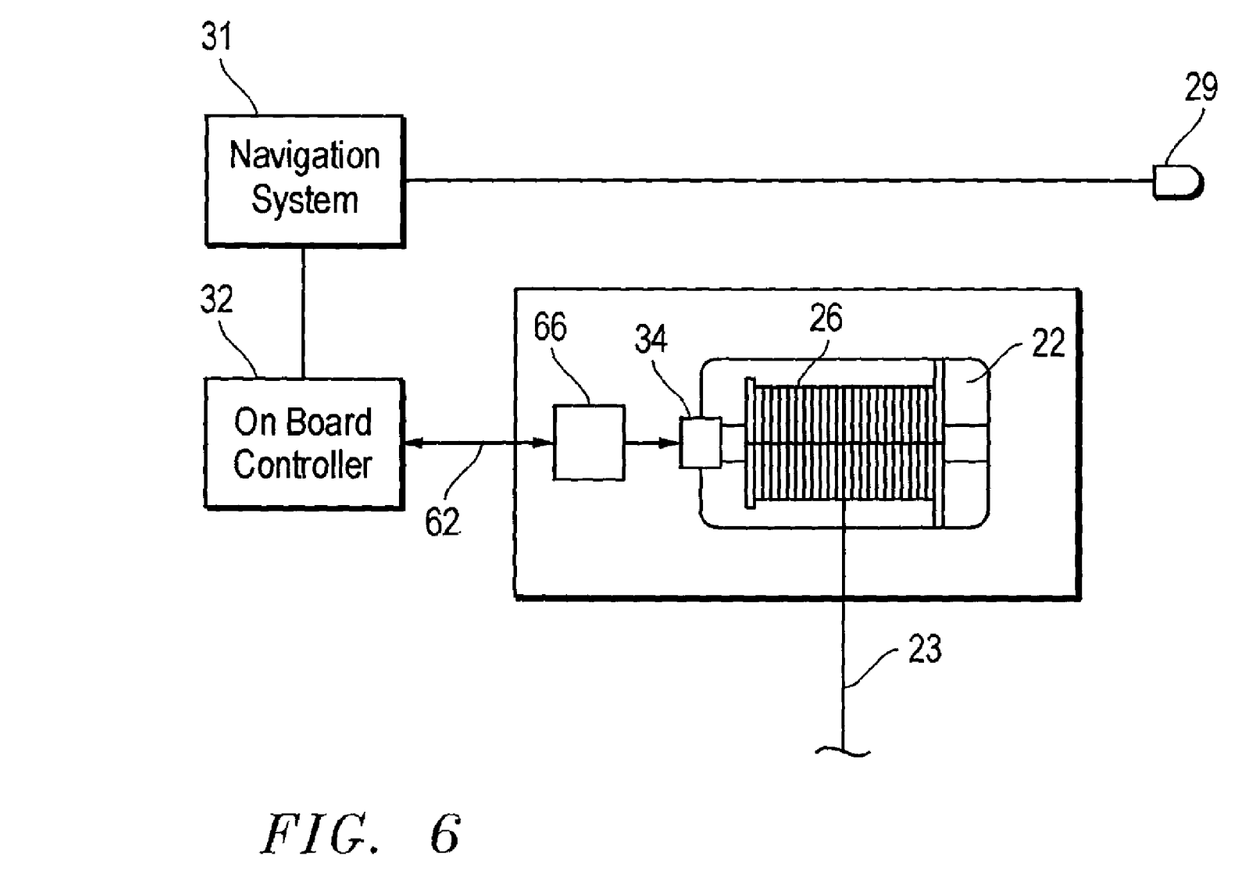
FIG. 6 is a schematic diagram of a control scheme to steer a source array in accordance with the present invention.

FIG. 6 is a schematic diagram of a control scheme to steer a source array in accordance with the present invention. The positioning unit 29 mounted on one of the sub-arrays 14 that make up the source array 12 (see FIG. 1) transmits the position of the sub-array 14 to the navigation system 31 located on the tow vessel 11 (see FIG. 1). The navigation system 31 provides the location information received from the positioning unit 29 to the on-board controller 32. The on-board controller 32 may be a computer, a distributed control system, an analogue control system or other control device known to those having ordinary skill in the art. The on-board controller 32 preferably communicates with the local controller 29 through the umbilical 62 running between the ship and the winch as known to those having ordinary skill in the art, but may communicate through a wireless transmission. The umbilical 62 contains conductors for providing power and control signals to and from the winch 22. The local controller 66, acting as a slave to the on-board controller 32, sends a signal to the electric motor 34 that moves the reel 26 to pull the winch cable 23 onto the reel 26 or feed the winch cable 23 off the reel 26, thereby moving the source array 12 to a desired location (FIG. 1). There may be more than on GPS or other positioning unit 29 mounted on one or more source array. Using the one or more positioning units 29 provides a location of the geometric center of each source array, which may be positioned as desired using apparatus and method of the present invention.

Figure 7A:
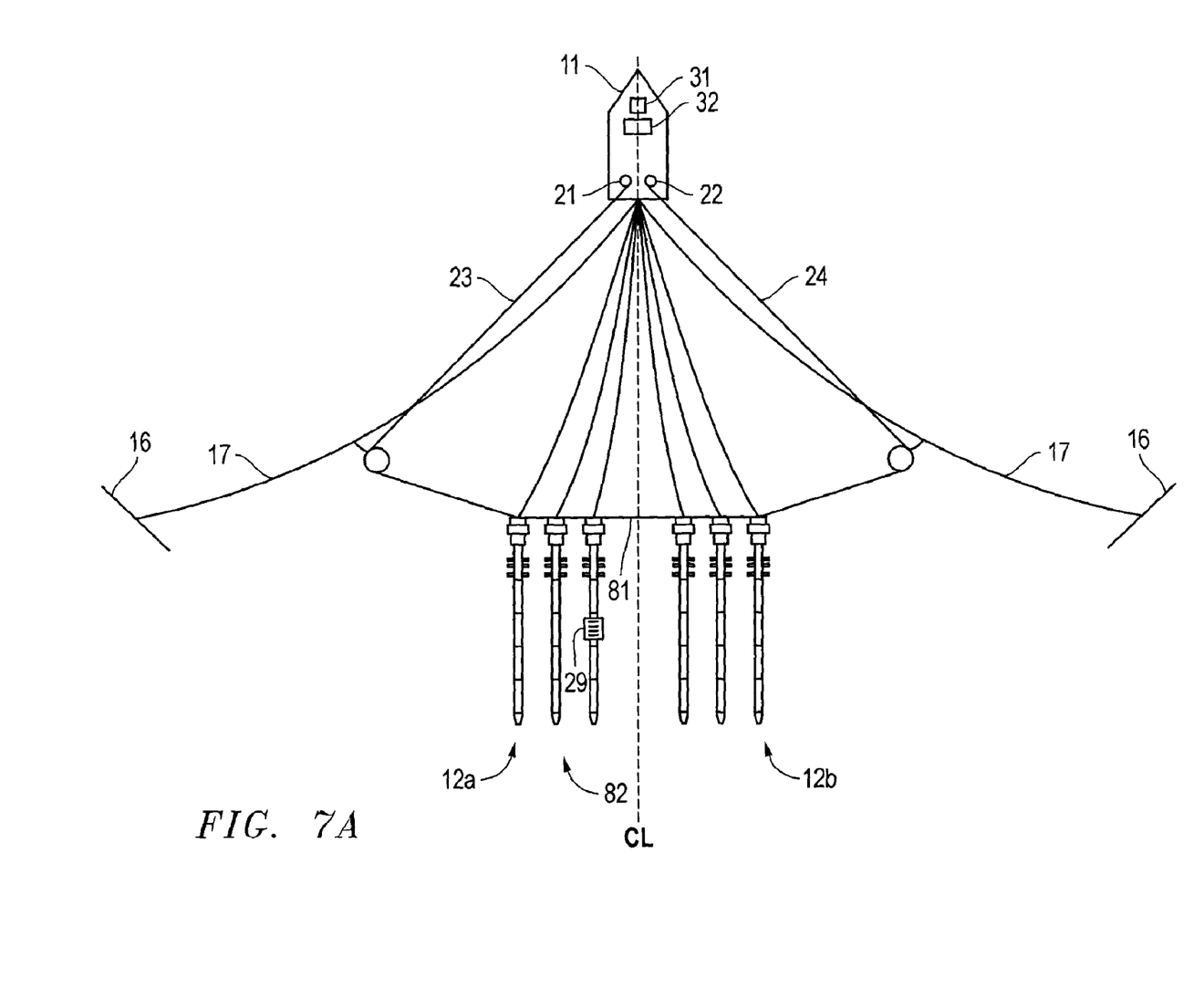
FIGS. 7A-7B are aerial views of a marine seismic survey system having multiple source arrays towed behind a tow vessel.
Figure 7B:
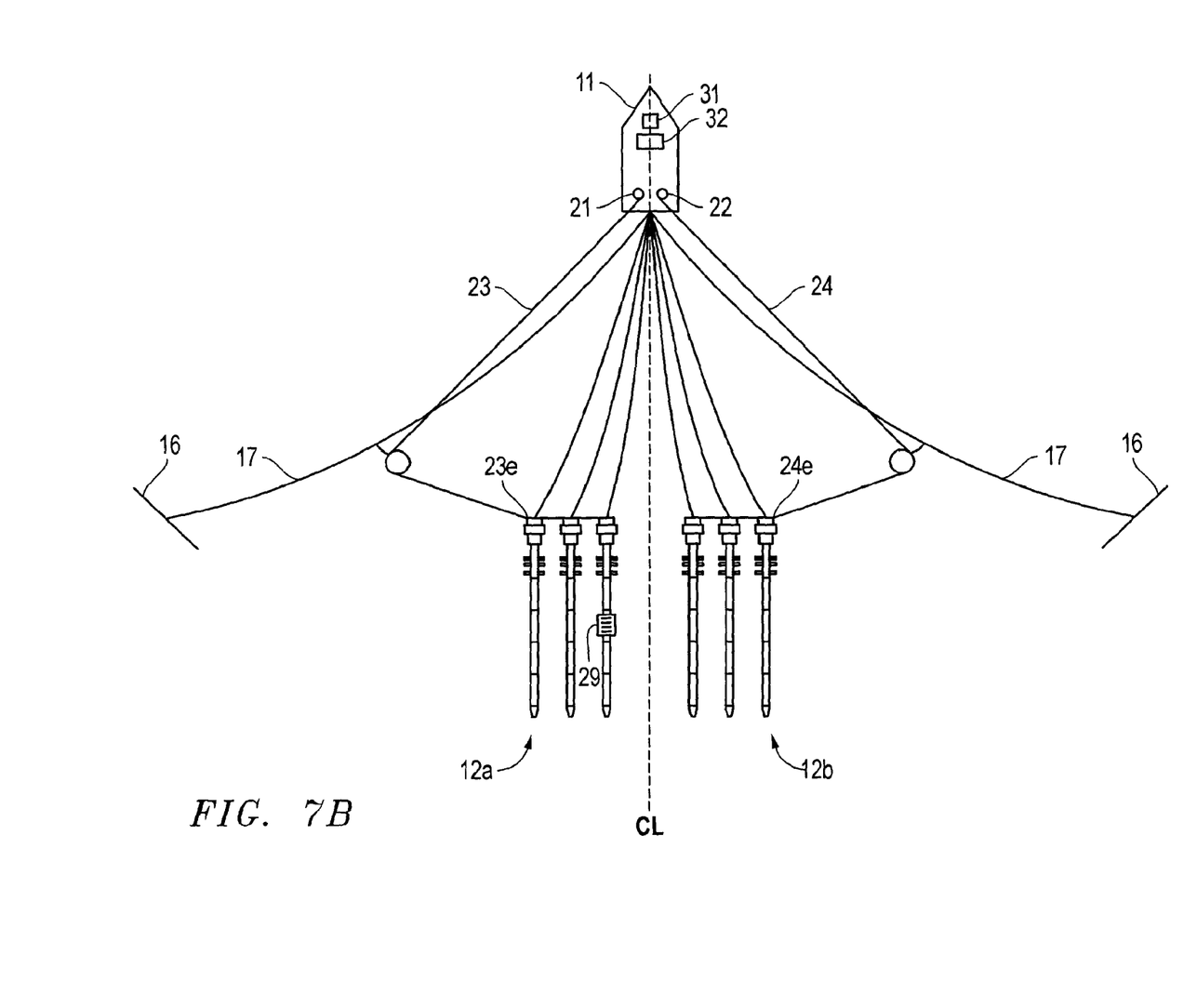
Figure 8:
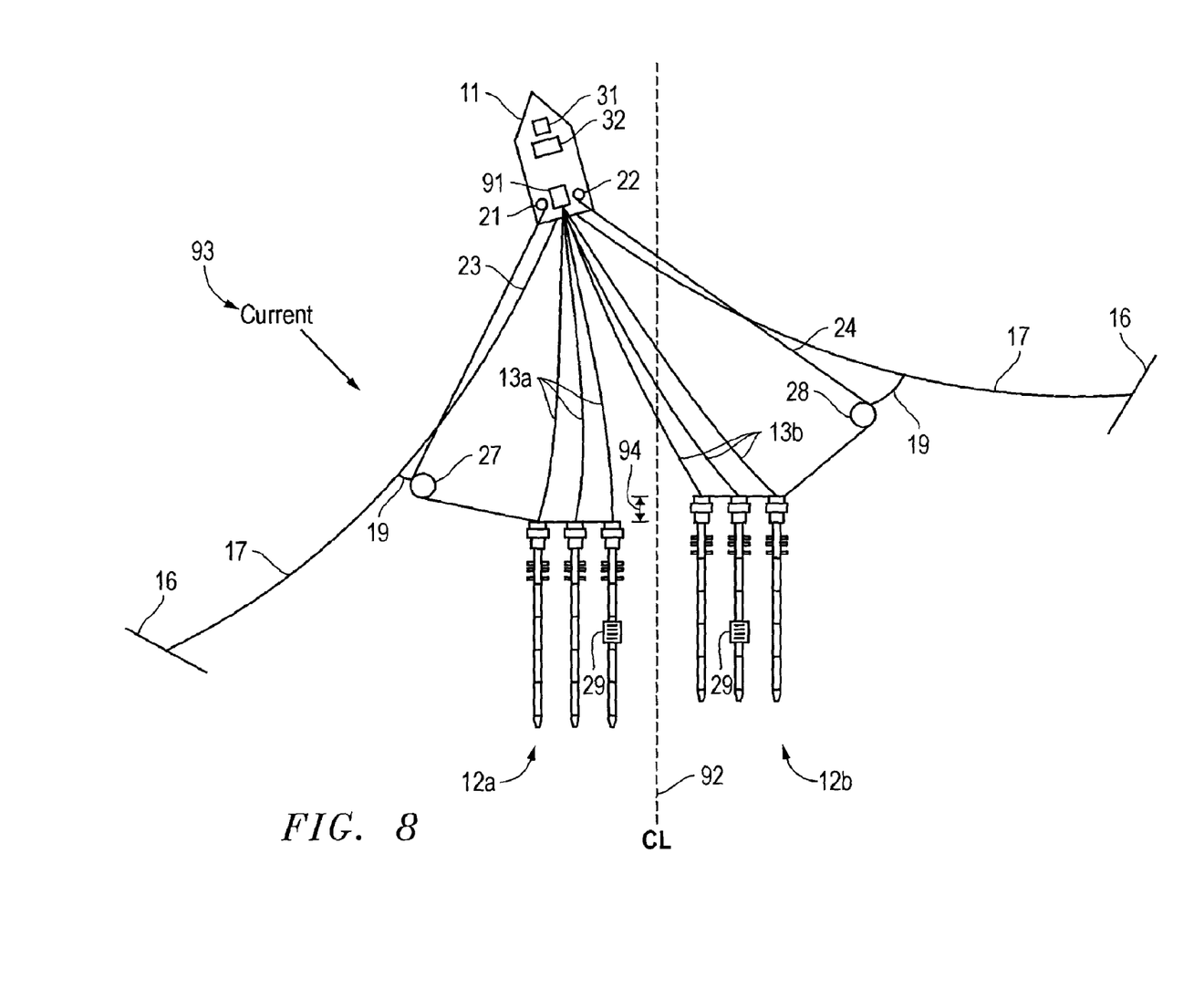
FIG. 8 is an aerial view of a marine seismic survey system having multiple source arrays towed behind a tow vessel that are capable of being steered to a desired crossline and inline position in accordance with the present invention.

FIGS. 7A-7B are aerial views of a marine seismic survey system having multiple source arrays towed behind a tow vessel. FIG. 7A is an aerial view of two source arrays 12a, 12b being towed by a tow vessel 11 that are coupled together with distance ropes 81. Because the two source arrays 12a, 12b are coupled together, the two source arrays 12a, 12b act as one source array group 82. The winch cables 23, 24 are attached to opposite sides of the source array group 82. The source array group 82 is guided by the winches 21, 22 mounted on the tow vessel 11 as described above for one source array. Optionally, the winches may be coupled to the deflector lead-ins 17 as shown in FIG. 3, thereby steering the source array group 82 as a single source array 12 as described above. Each of the individual source arrays 12a, 12b may be fired separately or in unison but they are steered by the winches to a desired position as a single source array in the configuration shown in FIG. 7A.

FIG. 7B is an aerial view of two source arrays 12a, 12b that are not coupled together being towed by a tow vessel 11. Each of the source arrays 12a, 12b are positioned independently of each other by the winches 21, 22 mounted on the tow vessel 11. Optionally, the winches may be attached to the deflected lead-ins 17 as shown in FIG. 3. Each of the source arrays 12a, 12b are influenced by the deflected lead-ins 17, but tend to follow the tow vessel 11 centerline. Therefore, to reliably control their positions, lateral forces need only be applied externally to move the source arrays away from the tow vessel 11 centerline. Since each of the ends 23e, 24e of the winch cables is attached to only one side of the arrays 12a, 12b, the source arrays 12a, 12b are pulled in opposite directions away from the tow vessel 11 centerline when the winch cables 23, 24 are winched in. When the winch cables 23, 24 are fed out, the source arrays 12a, 12b are moved towards the tow vessel 11 centerline by the forces exerted by the water. The deflected lead-ins 17 are shown towing dedicated deflectors 16 used only to provide the lateral force required to move the source arrays 12a, 12b. Similar arrangements of dedicated deflected lead-ins 17 are suitable for all embodiments of the present invention.

FIG. 8 is an aerial view of a marine seismic survey system having multiple source arrays towed behind a tow vessel that are capable of being steered to a desired crossline and inline position in accordance with the present invention. Two source arrays 12a, 12b are towed by a tow vessel 11 using the gun cables 13a, 13b that attach the source arrays 12a, 12b to the winches 91 mounted on the tow vessel 11. Each of the source arrays 12a, 12b may be moved to a desired crossline position relative to the centerline of the survey path 92 as described above and as shown in FIG. 7B. Alternatively, each of the source arrays may be moved to a desired crossline position relative to the centerline of the survey path 92 by any of the systems or methods described above in accordance with the present invention.

To position the source arrays to a desired inline position relative to an inline reference, such as the front end(s) of one or both of the source arrays, a winch 91 adjusts the length of each of the gun cables 13a, 13b so that the both the source arrays 12a, 12b are, for example, evenly aligned with each other relative to a line perpendicular to the centerline of the survey path 92.

To tow the source arrays along a tow path parallel to the centerline of the survey path 92, the tow vessel 11 steers off the centerline 92 to compensate for current forces 93, as well as other applied forces. Without adjusting the lengths of the gun cables 13a, 13b, the source arrays 12a, 12b are offset by a distance 94 determined by the magnitude of the compensation made by the tow vessel 11 to overcome the current 93 or other forces, such as the wind, tide, etc. By lengthening the gun cables 13b attached to the leading source array 12b, the inline position of the source array 12b is modified to reduce the offset distance 94 to a minimum acceptable amount. The length of the gun cables 13a, 13b can be adjusted by the winches 91 mounted on the tow vessel 11, by feeding gun cables off reels of the winches 91 to lengthen the gun cables or by taking gun cables up onto the winches 91 to shorten the gun cable 13a, 13b.

Also mounted on at least one of the source arrays 12a, 12b is a global positioning system (GPS) unit 29 that notifies the navigation system 31 of the tow vessel 11 of the accurate location of the source arrays 12a, 12b. A controller 32 compares the present location of the source arrays 12a, 12b as reported by the navigation system 31 to a desired crossline and inline position and then sends a control signal to actuators on the winches 21, 22, 91 to rotate the reels of the winches and thereby guide the source arrays 12a, 12b to the desired crossline and inline position.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for adjusting a seismic source array, comprising:
towing the seismic source array between a first array of seismic streamers and a second array of seismic streamers, the seismic source array having seismic sources for exerting energy to the earth;
receiving a current position of the seismic source array; and
moving the seismic source array in response to the current position toward the first array of seismic streamers and away from the second array of seismic streamers using a winch disposed on a vessel used to tow the seismic source array, wherein the winch comprises a winch cable having a first segment and a second segment coupled to opposite sides of the seismic source array.

2. The method of claim 1, wherein moving the seismic source array comprises moving the seismic source array to a desired cross line position.

3. The method of claim 1, wherein moving the seismic source array comprises:
decreasing the length of the first segment; and
increasing the length of the second segment.

4. The method of claim 1, wherein moving the seismic source array comprises rotating a first reel around which the first segment is wrapped in a first direction and rotating a second reel around which the second segment is wrapped in a second direction opposite the first direction, wherein the first reel and the second reel are mounted on the vessel.

5. The method of claim 4, further comprising:
comparing the current position with a desired cross line position; and
rotating the first reel and the second reel to guide the seismic source array toward the desired cross line position.

6. The method of claim 1, wherein moving the seismic source array comprises rotating a capstan around which the first segment and the second segment are wrapped, wherein the capstan is mounted on the vessel.

7. The method of claim 1, wherein moving the seismic source array comprises:
taking in the first segment; and
letting out the second segment.

8. The method of claim 1, wherein the first segment is threaded through a first pulley attached to a first lead-in coupled to the first array of seismic streamers and the second segment is threaded through a second pulley attached to a second lead-in coupled to the second array of seismic streamers.

9. The method of claim 1, further comprising:
towing the seismic source array substantially along the center line of the vessel; and
towing the first array of seismic streamers and the second array of seismic streamers off the center line of the vessel.

10. The method of claim 1, wherein moving the seismic source array comprises applying lateral forces to the seismic source array.

11. The method of claim 1, wherein the current position is determined using a global positioning system.

12. A method for adjusting a seismic source array, comprising:
- towing the seismic source array substantially along the center line of a vessel, the seismic source array having seismic sources for exerting energy to the earth;
- towing a first array of seismic streamers and a second array of seismic streamers off the center line of the vessel;
- receiving a current position of the seismic source array;
- comparing the current position with a desired position; and
- exerting lateral forces to the seismic source array toward the first array of seismic streamers in response to the comparison using a winch disposed on the vessel, wherein the winch comprises a winch cable having a first segment and a second segment coupled to opposite sides of the seismic source array.

13. The method of claim 12, wherein exerting the lateral forces comprises:
- decreasing the length of the first segment; and
- increasing the length of the second segment.

* * * * *